Figure 1:
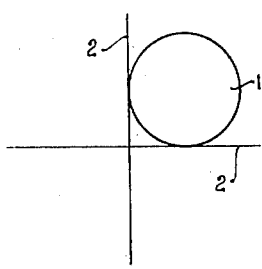

May 2, 1950 R. ROELOFS 2,506,037

SOLAR ATTACHMENT FOR THEODOLITES

Filed May 11, 1948

Inventor
Roelof Roelofs
By C. F. Wenderoth
Att'y

Patented May 2, 1950

2,506,037

UNITED STATES PATENT OFFICE 2,506,037

SOLAR ATTACHMENT FOR THEODOLITES

Roelof Roelofs, Delft, Netherlands, assignor to Cornelis Johannes van Leeuwen, Delft, Netherlands Application May 11, 1948, Serial No. 26,449
In the Netherlands May 19, 1947

2 Claims. (Cl. 88—2.3)

The invention relates to an attachment for a theodolite to facilitate the accurate pointing of the telescope thereof at the sun.

When surveys in which solar observations are used have to be made, it is necessary that the image of the sun in the telescope always covers exactly the same portion of the field of view. To that end the telescope is generally so pointed at the sun, that the image of the latter, which is a bright disc, is located in one of the quadrants of the field of view divided by the cross-hairs of the telescope. It should be attempted to keep the sun's disc tangent to the two cross-hairs bordering said quadrant. This means that the disc is located excentrically in the field of view which makes an accurate observation of the position of the sun's image difficult and involves irregular expansion of the optical parts heated by the rays of the sun. For ascertaining that both cross-hairs are simultaneously tangent to the sun's disc the observer has to turn his attention simultaneously to both tangency-points, which are a large distance apart. Since this is impossible he can only try to observe these points alternately as quickly as possible. It will be apparent that this fact makes the observation rather inaccurate. Another source of errors when carrying out this method is the fact that the cross-hairs are badly or often hardly visible against the relatively dark sky forming the background of the bright sun's disc.

The invention has for its object to overcome these difficulties. It provides an attachment for the theodolite comprising an auxiliary optical system by means of which at least two overlapping images of the sun are formed in the field of view of the telescope, said images so overlapping one another that the common chord of each pair of images is parallel to a hair of the marking means in said field of view of the telescope. By this attachment the image of the sun is formed in the center of the field of view. Thereby all errors due to the excentricity of the image are avoided. Besides the overlapping parts of the sun's discs form a very bright background for the dark crosshair or hairs. When four images of the sun are produced by the attachment the overlapping parts form a spider or cross having a dark square in the centre and four bright lancet-shaped limbs. In practice it has been found that the attachment according to the invention permits to adjust the telescope in a highly accurate and quick manner.

In a preferred form of the attachment to be used with telescopes having a field of view which is divided into four quadrants I, II, III, IV by cross-hairs the auxiliary optical system may consist of two prisms disposed one before the other, one of said prisms being operative in the quadrants I and II, the other being operative in the quadrants II and III and their angles of refraction lying in planes at right angles to each other and parallel to the hairs of the marking cross. Such a construction is very simple and inexpensive to make.

The invention also provides a device which can be readily attached to or removed from ordinary theodolites.

Figure 2:
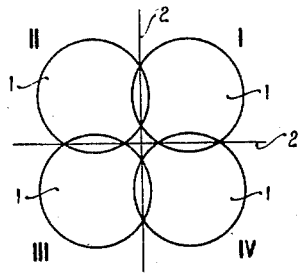
Figure 3:
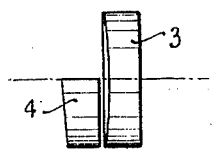
Figure 4:
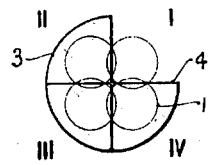
Figure 5:
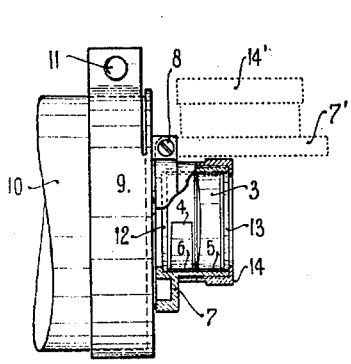
Figure 6:
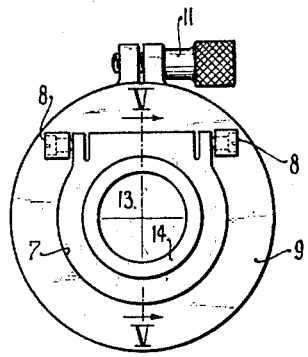

The principle and a preferred embodiment of the invention are illustrated in the accompanying drawing, wherein:

Fig. 1 shows the field of view of a normal theodolite when it is pointed at the sun and adjusted accurately, Fig. 2 illustrates the field of view of the same theodolite when the attachment according to the invention is used, Fig. 3 is an elevational view of the prism-system, Fig. 4 is a front view of said prism-system, Fig. 5 is partly an elevational and partly a sectional view of a device which can be readily attached to existing theodolites, and Fig. 6 is a front view of the device according to Fig. 5.

If surveys have to be carried out by means of a theodolite and solar observations have to be used therewith, the telescope of the theodolite is generally so pointed at the sun, that the image of the latter formed in the telescope is located in one of the four quadrants into which the field of view is divided by the hairs of the marking cross. It is then attempted to make and to keep the sun's image tangent to the cross-hairs 2 (see Fig. 1). This adjusting of the telescope appears simpler than it actually is. It can be carried out with a rather low degree of accuracy only. The disadvantages of this method of adjusting are that the sun's image is excentrically located in the field of view and that the crosshairs are hardly visible against the dark background.

These disadvantages are avoided by the invention according to which the optical system of the telescope is constructed in such manner that a multiple image of the sun, for instance the image as shown in Fig. 2, is produced. The optical system is so arranged that the chords of the overlapping sun's images are parallel to the hairs of the marking cross of the telescope. It has been found that the adjusting of the telescope is much easier in this way since the image as a whole is centrally located within the field of view, whereas a bright cross is provided by the overlapping parts of the sun's images as background for the cross-hairs.

In order to obtain the said multiple image prisms may be used, which are placed either in front of the objective or between the objective and the marking cross of the telescope. Figs. 3 and 4 show a very simple and relatively inexpensive prism-system. If in front of or within the telescope two prisms 3 and 4 are provided which cover the quadrants II, III and III, IV respectively and of which the angles of refraction are at right angles to one another, it will be evident, that four overlapping images can be produced and that it will be easy to get the four images shown in Figs. 2 and 4 so located in the field of view that the chords of the overlapping parts of the sun's discs will coincide with the cross-hairs. In that case the multiple image is located exactly centrally within the field of view.

In Figs. 5 and 6 the prisms 3 and 4 are mounted in metal rings 5 and 6, which are fixed in the right positions in a tubular holder 7. This holder is attached by hinges 8, 8 to a metal cap or collar 9, which is mounted in front of the objective on the frame of the telescope 10 of a theodolite. By means of the screw 11 the attachment may be clamped to or released from the front end of the telescope. When the theodolite is used for other observations than solar observations the prism-system may be turned away as is shown in dotted lines.

A dark filter 12 is provided by means of which the light and the heat of the sun which enter the telescope are reduced to a minimum. Said filter makes it possible to look into the telescope when it is pointed at the sun. Another filter 13 is provided for transmitting mono-chromatic light only. This filter avoids the difficulties caused by the chromatic dispersion. The prisms 3, 4 and the filters 12, 13 are held in place in the holder 7 by a screw cap 14.

Instead of the illustrated prism-system other optical systems may be used for the object of this invention.

What I claim is:

1. An optical attachment for a theodolite provided with a telescope, comprising a tubular holder, means for attaching said holder to the telescope in front of the objective thereof and with its axis coincident with the optical axis of the telescope, two prisms mounted one before the other within said holder, one of said prisms covering quadrants II and III of the optical aperture of the attachment, the other prism covering the quadrants III and IV of said aperture, the angles of deviation of said prisms lying in planes which are at right angles to each other and parallel to the axis of said tubular holder and filter means for transmitting mono-chromatic light, the prism system being such that irrespective of the apparent diameter of the sun four quadrangularly positioned overlapping images of the sun's disk are formed, when the optical attachment is directed at the sun.

2. In an attachment as claimed in claim 1, the means for attaching the holder to the telescope consisting of a collar ring adapted to be secured to the tube of the telescope and a hinge connecting the holder to said collar ring and permitting it to be swung about an axis at right angles to its axis into a position coaxial with the telescope or out of the field of view of the latter.

ROELOF ROELOFS.

REFERENCES CITED

The following references are of record in the file of this patent:

UNITED STATES PATENTS

| Number | Name | Date |
| --- | --- | --- |
| 991,591 | Abraham | May 9, 1911 |
| 1,501,979 | Willson | July 22, 1924 |